United States Patent [19]
Logsdon

[11] 3,884,438
[45] May 20, 1975

[54] PLUMBING STRUCTURE

[76] Inventor: Duane D. Logsdon, 1719 Canyon Rd., Fullerton, Calif. 92633

[22] Filed: Nov. 3, 1972

[21] Appl. No.: 303,591

[52] U.S. Cl............ 248/59; 248/62; 248/68 R; 248/74 R; 248/230
[51] Int. Cl............................. F16l 3/08
[58] Field of Search............ 248/58, 59, 74 R, 74 A, 248/74 B, 74 PB, 68 R, 221, 73, 274, 230, 62, 65, 70, 225; 137/343, 356, 357, 360; 211/94; 4/211

[56] References Cited
UNITED STATES PATENTS

| 780,420 | 1/1905 | Gross | 248/70 |
|---|---|---|---|
| 1,904,330 | 4/1933 | Ruff | 248/74 R X |
| 2,757,023 | 7/1956 | Hein | 248/70 X |
| 2,985,311 | 5/1961 | Abel | 211/94 X |
| 3,173,987 | 3/1965 | Potruch | 248/62 X |
| 3,347,505 | 10/1967 | Menser | 248/74 R X |
| 3,381,313 | 5/1968 | Rothmayr | 4/211 X |
| 3,404,858 | 10/1968 | Levy | 248/74 R X |
| 3,568,964 | 3/1971 | Perkins | 248/68 R |
| 3,582,030 | 6/1971 | Barrett | 248/74 A |
| 3,589,657 | 6/1971 | Pendley | 248/68 R |
| 3,618,622 | 11/1971 | Zien et al | 137/357 X |
| 3,684,223 | 8/1972 | Logsdon | 248/74 PB |

FOREIGN PATENTS OR APPLICATIONS

| 1,477,777 | 3/1967 | France | 248/74 R |
|---|---|---|---|
| 231,334 | 1/1959 | Australia | 248/74 A |

Primary Examiner—Roy D. Frazier
Assistant Examiner—Rodney H. Bonck
Attorney, Agent, or Firm—Edward D. O'Brian

[57] ABSTRACT

A plumbing structure or "tree" is disclosed that consists of an assembly of self-supporting pipes, a series and/or assembly of smaller non-self-supporting pipes located alongside of the assembly of the self-supporting pipes and a series of connecting structures extending between the two types of pipes so as to hold the smaller pipes in desired positions as construction progresses. Each of the connecting structures preferably includes a snap-on clip means engaging one of the self-supporting pipes, a rigid rod extending from each of the clip means and a hanger means engaging one of the smaller pipes mounted on the rigid rod of such a connecting structure. The connecting structures are designed for versatility of use in a number of different ways so that the non-self-supporting pipe may be mounted in any desired, convenient manner on the self-supporting pipe.

2 Claims, 8 Drawing Figures

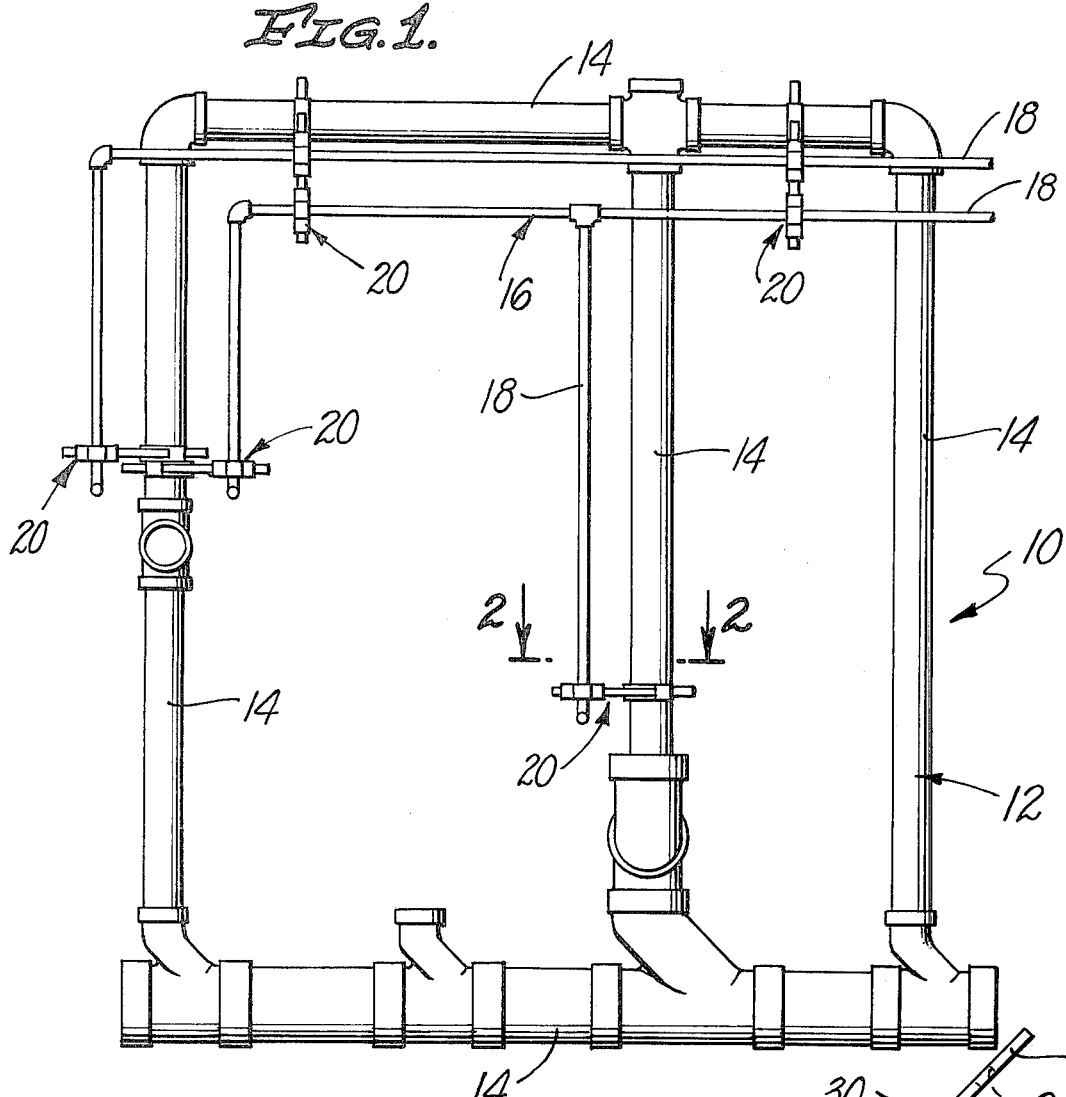
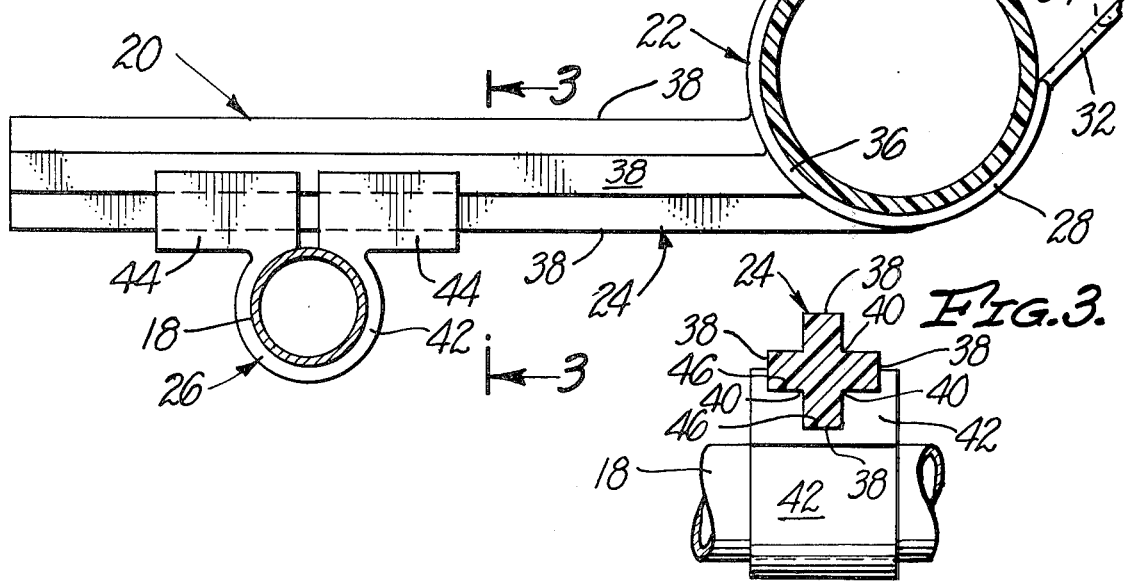

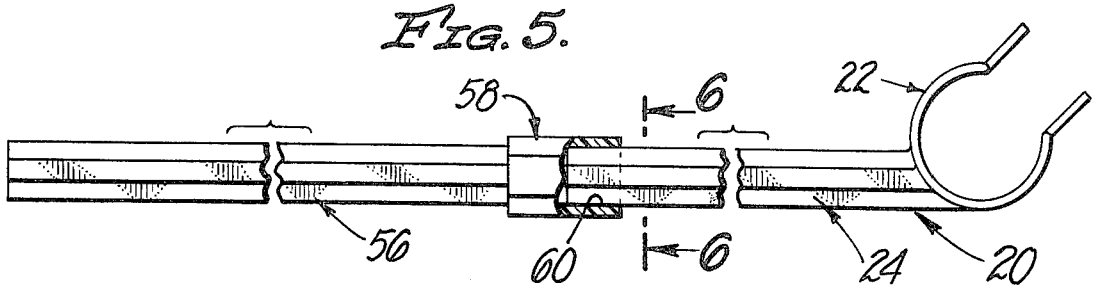
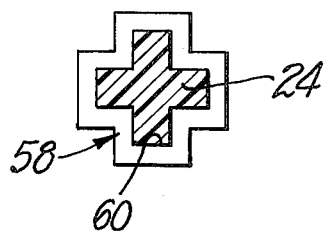
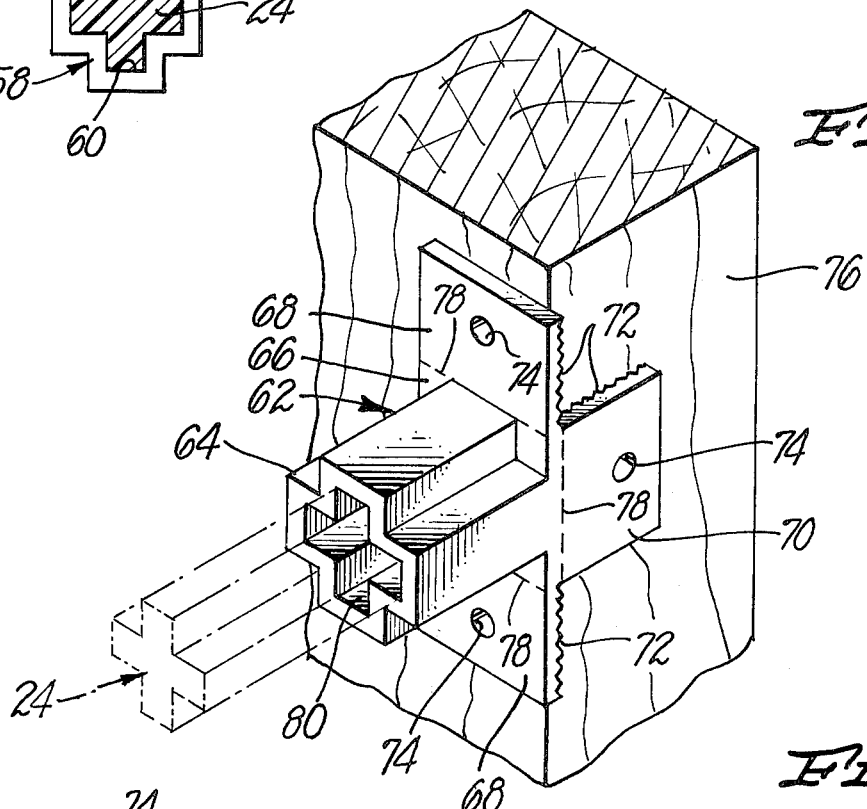
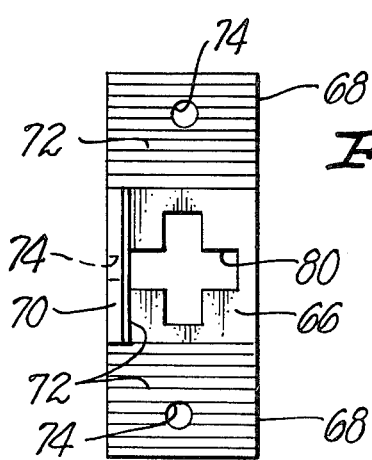
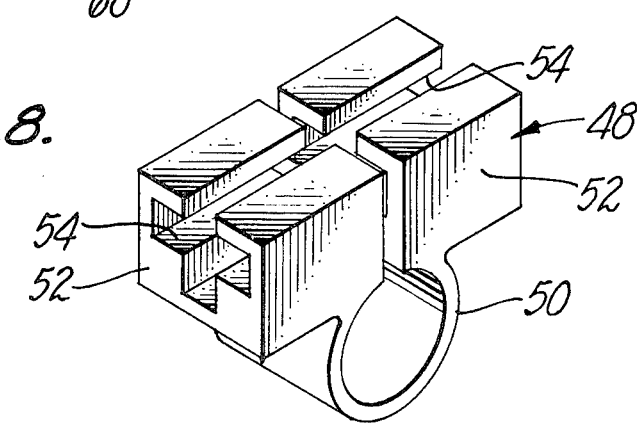

PLUMBING STRUCTURE

BACKGROUND OF THE INVENTION

This specification is directed towards the plumbing field and more specifically towards plumbing structures or "trees" consisting of an assembly of self-supporting pipes, a series of smaller non-self-supporting pipes and connecting structures holding such a series relative to such an assembly and towards various specific connecting structures and parts used in assembling such a composite plumbing structure or "tree."

At the present time frequently various buildings are constructed by assembling various self-supporting pipes in location where they will be located within a completed building and then constructing or erecting the building relative to or around the assembly of such self-supporting pipes. During such construction it is commonplace for plumbers to install various non-self-supporting pipes such as water pipes in a building or the like as it is being constructed. It will be apparent from this that plumbers have to periodically go to a construction site as a building is being constructed in this manner.

This is considered to be highly disadvantageous because of economic consideration. However, no practical way of avoiding the repeated appearance of plumbers on a construction site is considered to be known. It is believed that there have been various proposals advanced so as to avoid the repeated presence of plumbers during the construction of various types of buildings, but that such prior proposals have not been practical or utilitarian in character for any one of a variety of reasons.

BRIEF SUMMARY OF THE INVENTION

A broad objective of the present invention is to provide plumbing structures or "trees" which can be used so as to avoid at least some of the repeated appearance of plumbers at the sites of certain types of construction. Further, objectives of the invention are to provide such structures or "trees" which utilize relatively inexpensive connecting structures or parts, which may be easily and conveniently assembled and which adequately hold non-self-supporting pipe relative to self-supporting pipe so that conventional construction can go on around and about a plumbing structure or "tree" as herein indicated.

A further objective of the present invention is to provide new and improved connecting structures for use in holding non-self-supporting pipes in various locations. Preferably such connecting structures are constructed and used in holding non-self-supporting pipes upon self-supporting pipes in a complete plumbing structure or "tree" as indicated in the preceding discussion, but such structures can also be used in other ways as herein indicated. Other objectives of the invention are to provide connecting structures as described which are relatively inexpensive, which may be easily and conveniently used and which perform adequately for their intended purpose.

In accordance with this invention, these and various related objectives as will appear from the remainder of this specification are achieved in a plumbing structure or "tree" which consists of an assembly of self-supporting pipes, a series or assembly of smaller or non-self-supporting pipes located alongside the assembly of self-supporting pipes and a series of connecting structures extending between the two types of pipes so as to hold the smaller pipes in various desired positions as construction progresses. If desired, a connecting structure as herein indicated may be used to hold a single non-self-supporting pipe relative to a self-supporting pipe, but it is not considered that such utilization achieves the full advantages of this invention.

In accordance with this invention each of the connecting structures utilized preferably includes a snap-on clip means capable of engaging a self-supporting pipe, a rigid rod extending from the clip means in such a structure and a hanger means capable of engaging a smaller pipe mounted on the rod within such a structure. Preferably the clip means are formed integrally with the rod so as to facilitate installation. Preferably these rods are mounted so as to extend tangentially from the clip means so that the pipes in such a structure or "tree" may extend parallel to and adjacent to one another. The rods and hangers are preferably constructed as hereinafter indicated so as to permit an extreme amount of versatility in assembling a plumbing structure or "tree" as described.

BRIEF DESCRIPTION OF THE DRAWINGS

Because of the nature of this invention it is considered impossible to accurately and completely indicate all aspects of it in a summary such as the preceding. Further, details of the present invention will be more fully apparent from a detailed consideration of the remainder of this specification including the appended claims and the accompanying drawings in which:

FIG. 1 is a front-elevational view of a plumbing structure or "tree" in accordance with this invention;

FIG. 2 is a partial cross-sectional view taken at line 2—2 of FIG. 1;

FIG. 3 is a partial cross-sectional view taken at line 3—3 of FIG. 2;

FIG. 4 is an isometric view of a modified hanger means which can be employed with the invention;

FIG. 5 is a top plan view, partially in section, showing a connecting structure used in combination with an extension rod;

FIG. 6 is a cross-sectional view taken at line 6—6 of FIG. 5;

FIG. 7 is an isometric view showing a mounting means capable of being used with rod as indicated in the preceding FIGS. 1–3 and 5 and 6; and FIG. 8 is a rear-elevational view of the mounting means illustrated in FIG. 7.

The accompanying drawings are primarily intended to illustrate for explanatory purposes the essential character of certain presently preferred structures and in parts in accordance with this disclosure. The various structures and parts illustrated employ certain intangible concepts as are defined or summarized in the appended claims forming a part of this specification. Those skilled in the plumbing field will be able to utilize these concepts in a wide variety of different manners in differently constructed structures and parts through the utilization of routine skill in this field.

DETAILED DESCRIPTION OF THE PREFERRED EMBODIMENT

In FIG. 1 of the drawings there is shown a plumbing structure or "tree" 10 in accordance with this invention. This structure includes a self-supporting assembly 12 of various individual self-supporting pipes 14 which are secured together in a conventional manner so that the whole assembly 12 is a comparatively rigid structural unit. These pipes 14 may be of many different types. It is considered that in normal household type construction or in normal apartment construction that these pipes 14 will normally be of common ABS plastic. They may, of course, be of other materials. These pipes 14 in such construction will normally be utilized for sewer connection purposes and venting purposes.

The structure 10 also includes a series and/or assembly 16 of non-self-supporting pipes 18. These pipes 18 will normally be used in conveying both hot and cold water to various service outlets and the like. It is considered that normally the pipes 18 will be copper pipe capable of significant expansion and contraction during service use. However, these pipes 18 may be formed of other materials. Thus, for at least cold water utilization ABS plastic pipe or the like may be used.

During the practice of the present invention the structure of the tree 10 will normally be assembled on a building site or in a partially completed structure at such a time that suitable satisfactory building supports are unavailable for use in mounting the various pipes 18 indicated in the preceding. Normally the assembly 12 will be erected long before such suitable supports are in existence since the pipes 14 in the assembly 12 are of a self-supporting character.

In accordance with this specification, the completed structure or "tree" 10 is created after the assembly 12 has been erected by creating the assembly 16 at the same time that the assembly 12 is constructed through the use of connecting structures 20 as are shown in the drawings. It is considered that FIG. 2 of the drawings best indicates the nature of one of these connecting structures 20 employed. Such a connecting structure 20 utilizes a clip means 22 which is adapted to engage and hold one of the pipes 14, a rigid rod 24 extending from the clip means 22 and a hanger means 26 which is adapted to support and hold one of the pipes 18.

The specific details of these parts of a connecting structure in accordance with this invention are considered to be quite important relative to the utility of the invention as a whole and relative to the utility of these parts themselves. In order to facilitate installation and use a clip means 22 is preferably formed of a resilient, self-supporting plastic such as ABS material so as to have two curved arms 28 of a cylindrical interior configuration. These arms are preferably dimensioned so as to be capable of being snapped around a pipe such as one of the pipes 14 in such a manner that a connecting structure 20 is adequately held in place against undesired movement.

These arms 28 have opposed ends 30 which preferably, but not necessarily carry extending tabs 32. These tabs 32 normally extend nearly parallel to one another; they are provided with centrally located holes 34 adjacent to their ends. These tabs 32 may be used to facilitate a plumber springing the arms 28 of a clip means 22 apart so that these arms may be snapped around a pipe 14 with a minimum of difficulty.

If for any reason such a pipe should not be engaged in a desired manner by the arms 28 a common bolt may be inserted across the tabs 32 through the holes 34 and may be used to draw these tabs together so as to clamp the arms 28 into firm engagement with a pipe 14. When the pipe 14 is of a suitable material for use with an adhesive such as a conventional adhesive employed with an ABS plastic, the arms 28 may be and preferably are secured in place through the use of such an adhesive so that the complete structure 10 will be as rigid as reasonably possible.

If desired, what may be referred as a base 36 of a clip means 32 may be formed so as to include a socket (not shown) capable of holding the rod 24. However, in order to avoid assembly problems, to simplify a plumbers inventory and to make sure that a connecting structure 20 is as rigid as reasonably possible it is preferred that such a base 36 be formed as an integral part of a clip means 22 and a rod 24. Such a rod 24 should be of a rigid character and should extent tangentially from a clip means 22 as shown in FIG. 2 of the drawings.

This is considered important since when a connecting structure 20 is formed in this manner various pipe such as the pipe 18 can conveniently be mounted alongside and parallel to the pipes 14 in an assembly 12 in such a manner that the complete structure or "tree" 10 is relatively flat and compact and in general is no thicker than the area permitted for piping in a common building wall. From this it will be apparent that the structure or "tree" 10 shown includes two flat assemblies—the assembly 12 and the series or assembly 16.

Although a rod 24 can have any desired shape it is considered that effective results require that the rods 24 be of a non-round shape and that preferably they have flat surfaces located at 90° angles to one another. This is considered to facilitate the use of connecting structures 20 so that various pipes 18 may be supported in a conventional rectilinear manner with a minimum of difficulty in both horizontal and vertical locations corresponding to horizontal and vertical locations of the pipe 14 within the assembly 12.

It is preferred that the rod 24 used be of a symmetrical, cruciform shape as shown in the drawings so as to have four spaced surfaces 38 of identical dimension separated from one another by identical notches 40. It will be noted that there are two pairs of these surfaces 38. The surfaces 38 within each of these two pairs are located parallel to one another; the surfaces 38 of the pairs are located at right angles to one another. This cruciform shape of the rod 24 has several advantages. One of these is, of course, the comparative strength of the rod 24 against bending per unit of weight material in the rod.

Another advantage of the shape of the rod 24 pertains to a hanger means 26 as indicated. Such a hanger means 26 is preferably constructed substantially as shown in the U.S. Pat. No. 3,684,223 issued Aug. 15, 1972, entitled "Pipe Clamp" so as to include a central cylindrical section 42 carrying a pair of attaching flanges 44. The entire disclosure of this U.S. patent is incorporated herein by reference. This hanger means 26 is formed of a sufficiently flexible material so that it may be snapped open to receive a pipe such as the pipe 18.

Preferably the hanger means 26 includes flexible ribs and ridges as are described in this U.S. patent. In the interest of brevity such items are not indicated herein. They are explained in full in this U.S. patent. They permit temperature caused expansion and contraction of the pipe such as the pipe 18. This is important with the present invention since the structure or "tree" must be capable of accommodating pipe expansion and contraction in a finished building. It will be realized that this structure 10 remains intact in a finished building erected around and about it.

A hanger means 26 used with the present invention differs from those shown in this issued patent in that it includes grooves 46 in the bottoms of mounting flanges 44 which are shaped so as to fit around approximately one-half of the rod 24 in such a manner that a hanger means 26 securely engages such a rod 24. The hanger means 26 used may be secured in any desired location along the length of a rod 24 through the use of an adhesive within a groove 46 or through the use of conventional fasteners. Such a hanger means 26 is secured as shown in the drawings so that the assemblies 12 and 16 essentially lie in flat, parallel planes which are as adjacent to one another as reasonably possible.

If desired, a modified hanger means 48 as shown in FIG. 4 of the drawings may be used in lieu of the hanger means 26. The hanger means 48 has a center section 50 which corresponds to the section 42 and flanges 52 which correspond to the flanges 44. The modified hanger means 48 differs from the hanger means 26 in that it includes grooves 54 which fit completely around three of the surfaces 38 and engages all of the notches 40 of a rod 24 so that it cannot fall off such a rod. Whereas the hanger means 26 may be located in place by merely being abutted against the rod 24, the hanger means 48 must be slid in place over an end of such a rod. The positive interlock obtained with a hanger means 48 may be desirable for some applications, but is considered to require a more difficult assembly than the hanger means 26.

On cases where, for one reason or another, a rod 24 supplied with a connection structure 20 is undesirably long the rod 24 on such a structure 20 may conveniently be cut to a desired length. If the rod 24 supplied with a connecting structure 20 is undesirably short for an application, such a rod may be secured to another similarly shaped rod 56 through the use of an adhesively or similarly secured conforming coupling 58 having an internal cruciform shaped tubular cavity 60 as indicated in FIG. 5 of the drawings.

In case a rod 24 should, for one reason or another, receive auxiliary support from other than a pipe 14, it is possible to support an end of the rod 24 using a mounting means 62 as indicated in FIGS. 7 and 8 of the drawings. This mounting means 62 includes another coupling 64 corresponding to the coupling 58 having a base 66. This base 66 carries on two of its opposed edges flat attaching tabs 68 extending in the same plane. Another attaching tab 70 is located along an edge of the base 66 at right angles to this base 66 and the tab 68. The tabs 68 and 70 are preferably provided with bottom grooves 72 and nail holes 74 which may be used in attaching them to a support member 76. These tabs 68 and 70 are preferably separated from the base 66 by scored lines 78 so that they may be separated from the base 66 if this should be necessary in solving any particular mounting problem.

Because of one of the ways that the mounting means 62 can be used, it may be referred to as a stud bracket. Because of the location of the tabs 68 and 70 this mounting means 62 can be used at the corner of a member such as the member 76 so as to hold a rod 24 at a right angle to such a member. If desired the tab 70 may be separated along a scored line 78 so that this mounting means 62 may be secured by nails or similar means to a flat member. The tab 68 may be similarly separated so that the mounting means 62 may be supported only by means of the tab 70.

Further this mounting means 62 may be used directly as the coupling 58 with the tabs 68 and 70 either in place upon it or removed since it has an internal passage 78 corresponding to the external dimensions of the rod 24 extending completely through it and the base 66. As the result of the versatility of the mounting means it may be regarded as a universal fixture capable of being used by a plumber in a number of ways. The use of this mounting means 62 is considered desirable because it tends to cut down on the number of items that a plumber must carry to a job site.

When, as preferred, the rod 24 is formed out of ABS or similar material a plumber has the option of attaching this rod 24 and a clip means 22 to a support member such as the member 76 in another way. When the rod 24 is formed, the rod 24 may be directly nailed to a support member such as the member parallel to a surface of it. It is contemplated that normally a rod 24 will not be attached to a support member such as the member 76 in either this manner or through the use of a mounting means 62. However, from a practical standpoint, it is considered important that a combined structure consisting of the clip means 22 and the rod 24 is capable of being mounted in either of these manners or in various other ways so as to solve specialized problems which may be encountered in a specific application.

One of the major features of the structures disclosed is the versatility inherent within these structures enabling them to be adapted and used in a wide variety of different ways in order to meet particular construction needs or problems. The structures are considered to present a practical, effective, relatively inexpensive solution to the problem of minimizing labor costs and at the same time facilitating construction.

I claim:

1. A plumbing structure useful in the construction of a building which comprises:
    an assembly of connected self-supporting pipes located in a flat plane,
    a series of smaller non-self-supporting pipes located adjacent to and spaced from said self-supporting pipes in a flat plane adjacent to and extending alongside of said first mentioned plane,
    a series of connecting structures extending between said smaller pipe and said self-supporting pipe so as to hold said smaller pipe in a desired position with respect to said self-supporting pipes;
    said connecting structures being located generally in the interstices between said self-supporting and said non-self-supporting pipes in said planes,
    each of said connecting structures including:
      a. a snap-on clip means having curved arms resiliently engaging one of said self-supporting pipes,
      b. a hanger means engaging one of said smaller non-self-supporting pipes and c. a rigid rod which is integral with each of said clip means and which supports said hanger means associated therewith,
    each of said rods having a cruciform shape and having a uniform cross-sectional configuration extending along its length, each of said rods having parallel flat surfaces extending along its length located around its exterior, said clip means being capable of being snapped on said self-supporting pipe so as to be secured to said self-supporting pipe, a portion of each of said hanger means is shaped to conform to the cruciform shape of the rod with which it is associated so as to engage the rod with which it is associated so as to stabilize said hanger means upon said rods, said rods extending relative to said clip means so as to be generally within the same plane as said self-supporting pipes, said hanger means engaging said non-self-supporting pipes at various locations along the lengths of said rods so as to hold said series of non-self-supporting pipes in the plane within which said non-self-supporting pipes are located and being capable of being located at various positions along said rods, each of said hanger means being capable of being fitted against and secured to the rod with which it is associated in a plurality of different positions relative to the length of such rod and around the exterior of such rod.

2. A connecting structure for use in connecting two different pipes which are located in two different parallel planes to one another which comprises:

a clip means having a base and curved resilient arms extending from said base which are adapted to resiliently engage more than 180° around the exterior of a first pipe in one of said planes, a rigid rod having a symmetrical cruciform shape extending from said base of said clip means, said clip means and said rod being integrally formed with one another, hanger means for engaging a second pipe in the other of said planes, said hanger means being capable of being secured to said rigid rod along the length of said rigid rod so as to hold said second pipe in adjacent to said first pipe, said hanger means including means for engaging the exterior of said rod in a plurality of positions around the exterior of said rod and along the length of said rod so as to stabilize said hanger means upon said rod.

* * * * *